United States Patent
Wada et al.

(10) Patent No.: US 12,024,573 B2
(45) Date of Patent: Jul. 2, 2024

(54) METHOD FOR MANUFACTURING POLYMER AND FLOW-TYPE REACTION SYSTEM FOR MANUFACTURING POLYMER

(71) Applicant: FUJIFILM Corporation, Tokyo (JP)

(72) Inventors: Kenji Wada, Kanagawa (JP); Hideki Matsumoto, Kanagawa (JP); Kei Harada, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 625 days.

(21) Appl. No.: 17/210,514

(22) Filed: Mar. 24, 2021

(65) Prior Publication Data
US 2021/0206886 A1 Jul. 8, 2021

Related U.S. Application Data

(63) Continuation of application No. PCT/JP2019/035317, filed on Sep. 9, 2019.

(30) Foreign Application Priority Data

Sep. 27, 2018 (JP) .................. 2018-181794

(51) Int. Cl.
*C08F 2/01* (2006.01)
*B01J 19/18* (2006.01)
(Continued)

(52) U.S. Cl.
CPC .............. *C08F 2/06* (2013.01); *B01J 19/1812* (2013.01); *C08F 2/01* (2013.01); *C08F 2/38* (2013.01);
(Continued)

(58) Field of Classification Search
CPC ...... C08F 2/01; C08F 2/06; C08F 2/38; C08F 2/42; C08F 2/44; C08F 12/04; C08F 12/06; C08F 12/08
See application file for complete search history.

(56) References Cited

U.S. PATENT DOCUMENTS 9,000,109 B2 4/2015 Hamann et al.
9,598,447 B2 3/2017 Tadesse et al.
(Continued)

FOREIGN PATENT DOCUMENTS

JP H11209429 8/1999
JP 2007131718 5/2007
(Continued)

OTHER PUBLICATIONS

JP 2014-177538A (Sep. 25, 2014); machine translation. (Year: 2014).*

(Continued)

*Primary Examiner* — Rip A Lee
(74) *Attorney, Agent, or Firm* — JCIPRNET

(57) ABSTRACT

Provided is a method for manufacturing a polymer by a flow-type reaction, including introducing a liquid A containing an anionic polymerizable monomer and a non-polar solvent, a liquid B containing an anionic polymerization initiator and a non-polar solvent, a liquid C containing a polar solvent, and a polymerization terminator into different flow paths; allowing the liquids to flow in the respective flow paths; allowing the liquid A and the liquid B to join together at a joining portion; allowing a conjoined liquid $M^{AB}$ of the liquid A and the liquid B to join with the liquid C at downstream of the joining portion; subjecting the anionic polymerizable monomer to anionic polymerization while a conjoined liquid $M^{ABC}$ of the conjoined liquid $M^{AB}$ and the liquid C is flowing to downstream in a reaction flow path; and allowing a polymerization reaction solution flowing in the reaction flow path to join with the polymerization terminator so that the polymerization reaction is terminated and a polymer is obtained, in which a polarity of a solvent of the liquid $M^{ABC}$ is made higher than a polarity of a solvent
(Continued)

of the liquid $M^{AB}$. Also provided is a flow-type reaction system suited for performing the manufacturing method.

11 Claims, 2 Drawing Sheets

(51) Int. Cl.
*C08F 2/06* (2006.01)
*C08F 2/38* (2006.01)
*C08F 2/42* (2006.01)
*C08F 12/08* (2006.01)
*C08K 5/56* (2006.01)
*C08F 12/06* (2006.01)

(52) U.S. Cl.
CPC ............... *C08F 2/42* (2013.01); *C08K 5/56* (2013.01); *C08F 12/06* (2013.01); *C08F 12/08* (2013.01)

(56) References Cited

U.S. PATENT DOCUMENTS

| | | | |
|---|---|---|---|
| 11,242,414 B2 * | 2/2022 | Wada | B01J 19/0066 |
| 11,332,551 B2 * | 5/2022 | Wada | C08F 2/01 |

FOREIGN PATENT DOCUMENTS

| | | | | | |
|---|---|---|---|---|---|
| JP | 2011184653 A | * | 9/2011 | | |
| JP | 2014012827 | | 1/2014 | | |
| JP | 2014506950 | | 3/2014 | | |
| JP | 2014108977 | | 6/2014 | | |
| JP | 2014-177538 A | * | 9/2014 | ............... | C08F 2/04 |
| JP | 2014177538 | | 9/2014 | | |
| JP | 2015-193759 A | * | 11/2015 | ............... | C08F 2/48 |
| JP | 2016046011 | | 4/2016 | | |
| JP | 2016102107 | | 6/2016 | | |
| JP | 2016183217 | | 10/2016 | | |
| JP | 2017-66276 A | * | 4/2017 | ............... | C08F 2/00 |
| JP | 2017066276 | | 4/2017 | | |
| JP | 2017066276 A | * | 4/2017 | | |
| JP | 2018127619 | | 8/2018 | | |
| JP | 2018204039 A | * | 12/2018 | | |
| JP | 2020143277 A | * | 9/2020 | | |
| JP | 2021123606 A | * | 8/2021 | | |
| JP | 2021133312 A | * | 9/2021 | | |
| WO | 0158962 | | 8/2001 | | |
| WO | 2016003146 | | 1/2016 | | |
| WO | WO-2017213888 A1 | * | 12/2017 | | |
| WO | 2018163823 | | 9/2018 | | |
| WO | WO-2019031435 A1 | * | 2/2019 | | |

OTHER PUBLICATIONS

JP 2015-193759A (Nov. 5, 2015); machine translation. (Year: 2015).*

"Search Report of Europe Counterpart Application", issued on Nov. 5, 2021, pp. 1-9.

"International Search Report (Form PCT/ISA/210) of PCT/JP2019/035317," mailed on Nov. 12, 2019, with English translation thereof, pp. 1-5.

"Written Opinion of the International Searching Authority (Form PCT/ISA/237) of PCT/ JP2019/035317," mailed on Nov. 12, 2019, with English translation thereof, pp. 1-13.

"Office Action of Japan Counterpart Application", issued on Jun. 8, 2021, with English translation thereof, pp. 1-10.

"Office Action of Japan Counterpart Application", issued on Sep. 21, 2021, p. 1-p. 6.

"Office Action of China Counterpart Application", issued on Sep. 28, 2022, with English translation thereof, p. 1-p. 15.

* cited by examiner

METHOD FOR MANUFACTURING POLYMER AND FLOW-TYPE REACTION SYSTEM FOR MANUFACTURING POLYMER

CROSS-REFERENCE TO RELATED APPLICATIONS

This application is a Continuation of PCT International Application No. PCT/JP2019/035317 filed on Sep. 9, 2019, which claims priority under 35 U.S.C. § 119 (a) to Japanese Patent Application No. 2018-181794 filed in Japan on Sep. 27, 2018. Each of the above applications is hereby expressly incorporated by reference, in its entirety, into the present application.

BACKGROUND OF THE INVENTION

1. Field of the Invention

The present invention relates to a method for manufacturing a polymer. Furthermore, the present invention relates to a flow-type reaction system used for manufacturing a polymer.

2. Description of the Related Art

Living anionic polymerization is known as a method that can realize a precise polymerization reaction in synthesizing polymers having special structures such as a monodisperse polymer, a block copolymer, a functional group-terminated polymer, a multibranched polymer, and a cyclic polymer.

Living anionic polymerization is usually performed by a batch method. However, in a case where the living anionic polymerization is performed by a batch method, the heat generated during the polymerization needs to be removed so as to inhibit side reactions such as a chain transfer reaction and a termination reaction, and accordingly, the polymerization reaction is performed at an extremely low temperature. For example, the polymerization reaction is performed by mixing an anionic polymerizable monomer with an anionic polymerization initiator in a state of cooling the monomer and the initiator at a temperature equal to or lower than −78° C. Therefore, for performing the living anionic polymerization by the batch method, cryogenic cooling facilities are required, and such a polymerization method is not suited for mass production.

In addition, the living anionic polymerization by the batch method is carried out with mechanical stirring. Therefore, the monomer or the polymerization initiator tends to be unevenly localized in the reaction system. Accordingly, the living anionic polymerization by the batch method has limitations in improving the dispersity of the obtained polymer, the monomer conversion rate, and the like.

In addition, there is also a method known to continuously obtain a polymer having a narrow molecular weight distribution by means of living anionic polymerization by using a flow-type reaction device such as a microreactor. For example, JP2016-183217A describes anionic polymerization of an α-alkylstyrene monomer by a flow-type reaction, in which the monomer is polymerized by a method including a step of first adjusting a raw material solution obtained by mixing the monomer with an initiator to a certain high temperature so as to activate the monomer and a step of then allowing the raw material solution to flow in a flow path and at the same time rapidly cooling the solution to a temperature of a specific range in which polymerization can occur. JP2016-183217A describes that in a case where the above method is used, a high-molecular-weight polymer having a more monodisperse molecular weight distribution is obtained.

SUMMARY OF THE INVENTION

The polymerization method described in JP2016-183217A is extremely effective for increasing the molecular weight of the obtained polymer and for causing the obtained polymer to have a monodisperse molecular weight distribution. However, as a result of performing examinations from the viewpoint of the practical application of polymer manufacturing in the industrial field, the inventors of the present invention have found that the polymerization method described in JP2016-183217A sometimes results in a low monomer conversion rate, is still unsatisfactory from the viewpoint of the manufacturing efficiency and reproducibility of polymers and the like, and has limitations in further improving the monodispersity of the obtained polymers even though the conditions are optimized.

Therefore, an object of the present invention is to provide a method for manufacturing a polymer by living anionic polymerization using a flow-type reaction, which makes it possible to obtain a polymer having a highly monodisperse molecular weight distribution at an excellent monomer conversion rate. Another object of the present invention is to provide a flow-type reaction system suitable for performing the manufacturing method.

The objects of the present invention have achieved by the following means.

[1]
A method for manufacturing a polymer in which an anionic polymerization reaction is performed by a flow-type reaction, including
introducing a liquid A containing an anionic polymerizable monomer and a non-polar solvent, a liquid B containing an anionic polymerization initiator and a non-polar solvent, a liquid C containing a polar solvent, and a polymerization terminator into different flow paths; allowing the liquids to flow in the respective flow paths;
allowing the liquid A and the liquid B to join together at a joining portion; allowing a conjoined liquid $M^{AB}$ of the liquid A and the liquid B to join with the liquid C at downstream of the joining portion; subjecting the anionic polymerizable monomer to anionic polymerization while a conjoined liquid $M^{ABC}$ of the conjoined liquid $M^{AB}$ and the liquid C is flowing to downstream in a reaction flow path; and allowing a polymerization reaction solution flowing in the reaction flow path to join with the polymerization terminator so that the polymerization reaction is terminated and a polymer is obtained,
in which due to the joining of the conjoined liquid $M^{AB}$ with the liquid C, a polarity of a solvent of the liquid $M^{ABC}$ is higher than a polarity of a solvent of the liquid $M^{AB}$.

[2]
The method for manufacturing a polymer described in [1], in which both the flow path in which the liquid A flows and the flow path in which the liquid B flows have an equivalent diameter of 1 to 10 mm.

[3]
The method for manufacturing a polymer described in [1] or [2], in which the conjoined liquid $M^{AB}$ and the liquid C join together in a state where a monomer conversion rate in the conjoined liquid $M^{AB}$ is equal to or lower than 5.0 mol %.

[4]

The method for manufacturing a polymer described in any one of [1] to [3], in which due to the joining of the conjoined liquid $M^{AB}$ with the liquid C, a mass ratio of a polar solvent to the solvent in the conjoined liquid $M^{ABC}$ is 1.5 times or more of a mass ratio of a polar solvent to the solvent in the conjoined liquid $M^{AB}$.

[5]

The method for manufacturing a polymer described in any one of [1] to [4], in which an ether solvent is used as the polar solvent.

[6]

The method for manufacturing a polymer described in any one of [1] to [5], in which a length of the reaction flow path in which the liquid $M^{ABC}$ flows is 3 to 50 m.

[7]

The method for manufacturing a polymer described in any one of [1] to [6], in which the number of flow paths, which are connected to the joining portion of the liquid A and the liquid B and in which the liquid A flows, and the number of flow paths, which are connected to the joining portion of the liquid A and the liquid B and in which the liquid B flows, is 3 to 10 in total.

[8]

The method for manufacturing a polymer described in any one of [1] to [7], in which at least one organic lithium compound or at least one organic magnesium compound is used as the anionic polymerization initiator.

[9]

The method for manufacturing a polymer described in any one of [1] to [8], in which alkyl lithium is used as the anionic polymerization initiator.

[10]

The method for manufacturing a polymer described in any one of [1] to [9], in which n-butyllithium is used as the anionic polymerization initiator.

[11]

The manufacturing method described in any one of [1] to [10], in which the liquid B contains at least one aromatic hydrocarbon or at least one saturated hydrocarbon as a non-polar solvent.

[12]

A flow-type reaction system for manufacturing a polymer by an anionic polymerization reaction, including
a first flow path in which a liquid A containing an anionic polymerizable monomer and a non-polar solvent flows; a second flow path in which a liquid B containing an anionic polymerization initiator and a non-polar solvent flows; a third flow path in which a liquid C containing a polar solvent flows; a fourth flow path in which a polymerization terminator flows; a first joining portion where the first flow path and the second flow path join together; a pre-reaction tube connected to downstream of the first joining portion; a second joining portion where the pre-reaction tube and the third flow path join together; a reaction tube connected to downstream of the second joining portion; a third joining portion where the reaction tube and the fourth flow path join together; and a pipe line connected to downstream of the third joining portion,
in which a polarity of a solvent of a conjoined liquid $M^{AB}$ of the liquid A and the liquid B that join together at the first joining portion is higher than a polarity of a solvent of a conjoined liquid $M^{ABC}$ of the conjoined liquid $M^{AB}$ and the liquid C that join together at the second joining portion.

In the present specification, a range of numerical values described using "to" means a range including the numerical values listed before and after "to" as a lower limit and an upper limit.

In the present specification, in a case where the size of inner cross section of a tube (equivalent diameter) of a flow path, a joining portion, a mixer, or the like is described, this does not include the size of a connection portion of flow paths, a connection portion of a flow path and a joining portion, and a connection portion of a flow path and a mixer. That is, the size of each of the above connection portions is appropriately adjusted using a connecting tube or the like such that a fluid flows in the connection portion from upstream to downstream.

According to the manufacturing method of an embodiment of the present invention, it is possible to obtain a polymer having a highly monodisperse molecular weight distribution at an excellent monomer conversion rate. Furthermore, in a case where the manufacturing method is performed using the flow-type reaction system according to an embodiment of the present invention, it is possible to obtain a polymer having a highly monodisperse molecular weight distribution at an excellent monomer conversion rate.

DESCRIPTION OF THE PREFERRED EMBODIMENTS

[Flow-Type Reaction System]

Figure 1:
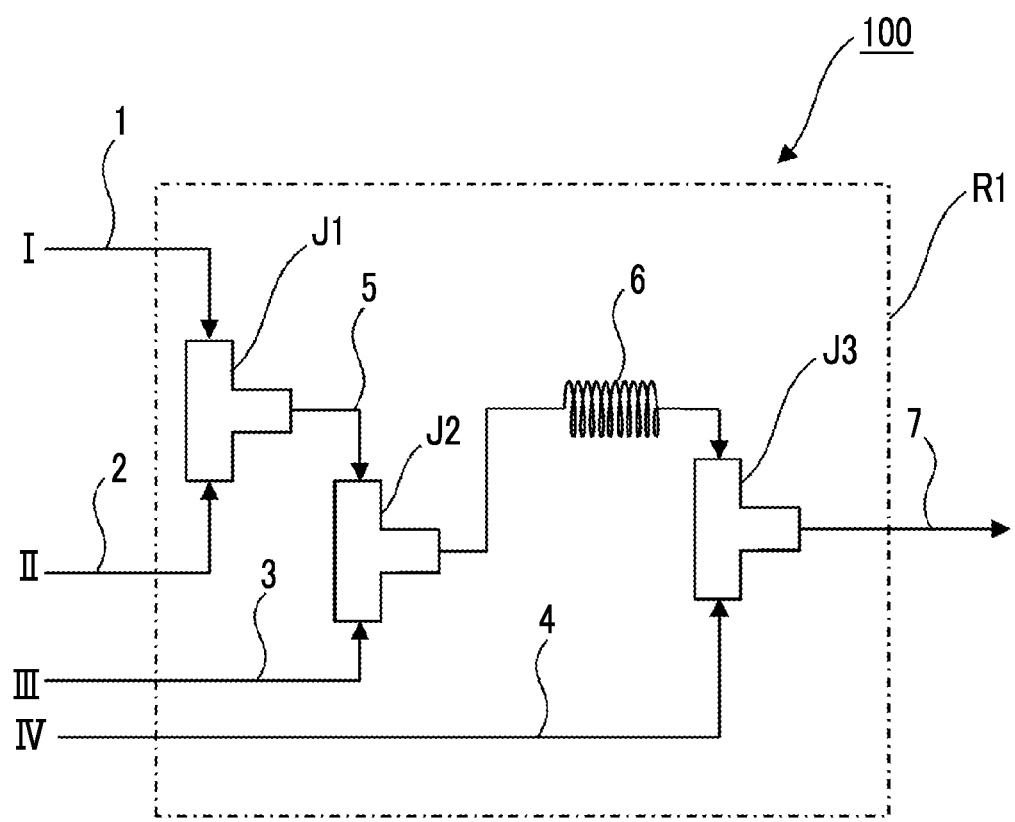
FIG. 1 is a view for schematically illustrating an embodiment of a flow-type reaction system of the present invention.

An embodiment of a flow-type reaction system used in the method for manufacturing a polymer according to an embodiment of the present invention (hereinafter, described as "manufacturing method of the present invention" as well) will be described using drawings. Except for the items specified by the present invention, the present invention is not limited to the aspects shown in the drawings.

FIG. 1 is a schematic view showing an example of the flow-type reaction system used in the manufacturing method of the present invention. A flow-type reaction system (100) shown in FIG. 1 comprises an anionic polymerizable monomer supply flow path (1) comprising an inlet port (I) for introducing a liquid (hereinafter, also called "liquid A") containing an anionic polymerizable monomer and a non-polar solvent, an anionic polymerization initiator supply flow path (2) comprising an inlet port (II) for introducing a liquid (hereinafter, also called "liquid B") containing an anionic polymerization initiator and a non-polar solvent, a polar solvent supply flow path (3) comprising an inlet port (III) for introducing a liquid (hereinafter, also called "liquid C") containing a polar solvent, a polymerization terminator supply flow path (4) comprising an inlet port (IV) for introducing a polymerization terminator, a joining portion (J1) where the anionic polymerizable monomer supply flow path (1) and the anionic polymerization initiator supply flow path (2) join together, a pre-reaction tube (5) connected to an end portion of the downstream side of the joining portion (J1), a joining portion (J2) where the pre-reaction tube (5)

and the polar solvent supply flow path (3) join together, a reaction tube (6) connected to an end portion of the downstream side of the joining portion (J2), a joining portion (J3) where the reaction tube (6) and the polymerization terminator supply flow path (4) join together, and a pipe line (7) connected to an end portion of the downstream side of the joining portion (J3).

In the embodiment shown in FIG. 1, at least the joining portion (J1), a region between the downstream of the joining portion (J1) and the joining portion (J3), the joining portion (J3), and a portion of the pipe line (7) connected to the joining portion (J3) are arranged in a constant-temperature tank (R1). During an anionic polymerization reaction and a polymerization termination reaction, it is preferable to control the temperature such that the liquid temperature is −100° C. to 40° C. (preferably −80° C. to 30° C., and more preferably −50° C. to 20° C.).

Usually, a liquid feeding pump (not shown in the drawing) such as a syringe pump is connected to each of the inlet ports (I), (II), (III), and (IV). By operating the pump, the liquid A, the liquid B, the liquid C, and the polymerization terminator can flow in each flow path.

In the present specification, "upstream" and "downstream" are used for the direction along which a liquid flows. A side where a liquid is introduced (in FIG. 1, the side of the inlet ports (I), (II), (III), and (IV)) is upstream, and a side opposite to the upstream is downstream.

Each configuration of the embodiment shown in FIG. 1 will be more specifically described.

<Anionic Polymerizable Monomer Supply Flow Path (1)>

The anionic polymerizable monomer supply flow path (1) is a flow path for supplying the liquid A introduced from the inlet port (I) to the joining portion (J1). The equivalent diameter of the anionic polymerizable monomer supply flow path (1) is preferably 1 to 10 mm. In a case where the equivalent diameter of the anionic polymerizable monomer supply flow path (1) is equal to or greater than 1 mm, even though the flow rate is increased to some extent, it is possible to inhibit the internal pressure of the system from excessively increasing and to further increase the polymer productivity. In a case where the equivalent diameter of the anionic polymerizable monomer supply flow path (1) is equal to or smaller than 10 mm, the liquid temperature can be accurately controlled at a point in time when the liquid is introduced into the joining portion (J1). The equivalent diameter of the anionic polymerizable monomer supply flow path (1) is more preferably 1 to 8 mm, and even more preferably 1 to 6 mm.

"Equivalent diameter" is a term used in the field of mechanical engineering, and is also called equilibrium diameter. Assuming that there is a circular tube equivalent to a pipe line or a flow path having a given inner cross-sectional shape of the tube, the diameter of the inner cross-section of the equivalent circular tube is called equivalent diameter. The equivalent diameter (deq) is defined as dep=4A/p in which A represents an inner cross-sectional area of a pipe line and p represents a wetted perimeter (inner perimeter) of a pipe line. In a case where the above definition is applied to a circular tube, the equivalent diameter equals the diameter of the inner cross section of the circular tube. Based on the data regarding an equivalent circular tube, the equivalent diameter is used for estimating the fluidity or the heat transfer characteristics of the pipe line, and shows the spatial scale (representative length) of a phenomenon. For a square tube in which a represents one side of the inner cross section of the tube, the equivalent diameter dep=$4a^2/4a$=a; for an equilateral triangular tube in which a represents one side thereof, deq=$a/3^{1/2}$; and for a flow between parallel flat plates in which h represents a height of a flow path, deq=2 h (for example, see "Mechanical Engineering Dictionary", edited by The Japan Society of Mechanical Engineers, 1997, Maruzen Co., Ltd).

The length of the anionic polymerizable monomer supply flow path (1) is not particularly limited, and the anionic polymerizable monomer supply flow path (1) can be constituted, for example, with a tube having a length of about 10 cm to 15 m (preferably 30 cm to 10 m).

The material of the tube is not particularly limited, and examples thereof include perfluoroalkoxyalkane (PFA), Teflon (registered trademark), an aromatic polyether ketone-based resin, stainless steel, copper or a copper alloy, nickel or a nickel alloy, titanium or a titanium alloy, quartz glass, soda lime glass, and the like. From the viewpoint of flexibility and chemical resistance, as the material of the tube, PFA, Teflon (registered trademark), stainless steel, a nickel alloy, or titanium is preferable.

The flow rate at which the liquid A is introduced from the inlet port (I) is not particularly limited, and can be appropriately selected according to the purpose in consideration of the equivalent diameter of the flow path, the concentration of the liquid B, the flow rate of the liquid B introduced, and the like. For example, the flow rate is preferably 1 to 4,000 mL/min, more preferably 5 to 3,000 mL/min, and even more preferably 50 to 3,000 mL/min. In a case where the flow rate of the liquid A introduced is within the above range, the mixing efficiency in the joining portion is increased. Therefore, a more monodisperse polymer can be obtained, and the concern about the pressure loss is reduced. The flow rate at which the liquid A is introduced may be 5 to 2,000 mL/min or 10 to 1,000 mL/min. The flow rate and can also be 20 to 800 mL/min or 40 to 600 mL/min.

—Liquid a Containing Anionic Polymerizable Monomer and Non-Polar Solvent—

The liquid A flowing in the anionic polymerizable monomer supply flow path (1) is usually a solution obtained by dissolving an anionic polymerizable monomer in a solvent containing a non-polar solvent. In the present invention, "non-polar solvent" means a hydrocarbon solvent. Examples of the non-polar solvent contained in the liquid A include hexane, heptane, octane, cyclohexane, methyl cyclohexane, benzene, toluene, xylene, decalin, tetralin, derivatives of these, and the like.

The non-polar solvent contained in the liquid A preferably contains at least one aromatic hydrocarbon or at least one saturated hydrocarbon. In this case, the total ratio of the aromatic hydrocarbon and the saturated hydrocarbon to the non-polar solvent is preferably equal to or higher than 50% by mass, more preferably equal to or higher than 70% by mass, even more preferably equal to or higher than 80% by mass, and still more preferably equal to or higher than 90% by mass. The non-polar solvent is particularly preferably at least one aromatic hydrocarbon or at least one saturated hydrocarbon. The aromatic hydrocarbon is preferably at least one of toluene or xylene, and more preferably toluene. The saturated hydrocarbon is preferably at least one of hexane, heptane, or cyclohexane, and more preferably hexane. The non-polar solvent contained in the liquid B is more preferably at least one of toluene or hexane.

The liquid A may further contain a polar solvent as long as the liquid A contains a non-polar solvent. In the present invention, "polar solvent" is a solvent (non-hydrocarbon solvent) having, as a constituent atom, an atom (hetero atom such as an oxygen atom, a sulfur atom, or a nitrogen atom)

that is not a carbon atom or a hydrogen atom. In a case where the liquid A contains a polar solvent, the polar solvent may be appropriately selected according to the type of the monomer to be used. Examples of the polar solvent include an ether solvent (a linear, branched, or cyclic ether solvent) and the like. Specifically, examples of the ether solvent include tetrahydrofuran, dioxane, trioxane, methyl t-butyl ether, cyclopentyl methyl ether, ethylene glycol dibutyl ether, diethylene glycol dimethyl ether, diethylene glycol diethyl ether, diethylene glycol dibutyl ether, derivatives of these, and the like.

In addition to the ether solvent, for example, it is possible to use polar solvents such as N,N-dimethylacetamide, N-methylpyrrolidone, 1,3-dimethyl-2-imidazolidinone, N,N'-dimethylpropylene urea, tert-butyl acetate, N,N-diisopropylethylamine, N,N,N',N'-tetramethylethylenediamine, and tetramethylpropylenediamine.

The ratio of the non-polar solvent to all the solvents contained in the liquid A is preferably equal to or higher than 40% by mass, more preferably equal to or higher than 50% by mass, even more preferably equal to or higher than 60% by mass, and particularly preferably equal to or higher than 70% by mass. The proportion may be equal to or higher than 80% by mass or equal to or higher than 90% by mass. It is also preferable that all the solvents contained in the liquid A be non-polar solvents.

The anionic polymerizable monomer in the liquid A is not particularly limited, and can be appropriately selected according to the purpose. Examples thereof include a vinyl aromatic hydrocarbon, an acrylic monomer, a methacrylic monomer, a conjugated diene, and the like.

Examples of the vinyl aromatic hydrocarbon include styrene, a styrene derivative (p-dimethylsilylstyrene, (p-vinylphenyl)methylsulfide, p-hexynylstyrene, p-methoxystyrene, p-tert-butyldimethylsiloxystyrene, o-methylstyrene, p-methylstyrene, p-tert-butylstyrene, α-methylstyrene, p-tert-butoxystyrene, p-tert-butoxy-α-methylstyrene, m-tert-butoxystyrene, p-(1-ethoxyethoxy)styrene, or the like), vinyl naphthalene, 2-tert-butoxy-6-vinyl naphthalene, vinyl anthracene, 1,1-diphenylethylene, and the like.

Examples of the acrylic monomer include methyl acrylate, ethyl acrylate, isopropyl acrylate, isobutyl acrylate, tert-butyl acrylate, cyclohexyl acrylate, benzyl acrylate, epoxy acrylate, ethylene glycol diacrylate, diethylene glycol diacrylate, trimethylolpropane triacrylate, and tetramethylene glycol tetraacrylate, 2-hydroxy-1,3-diacryloxypropane, 2,2-bis[4-(acryloxymethoxy)phenyl]propane, 2,2-bis[4-(acryloxyethoxy)phenyl]propane, dicyclopentenyl acrylate, tricyclodecanyl acrylate, tris(acryloxyethyl) isocyanurate, urethane acrylate, and the like.

Furthermore, examples of the methacrylic monomer include monomers having a structure obtained by substituting an acryloyl group of the monomers exemplified as the above acrylic monomer with a methacryloyl group.

Examples of the conjugated diene include 1,3-butadiene, 2-methyl-1,3-butadiene, 2,3-dimethyl-1,3-butadiene, 1,3-pentadiene, 1,3-hexadiene, 1,3-cyclohexadiene, and the like.

One of the above monomers may be used singly, or two or more monomers among the above monomers may be used in combination.

The content of the anionic polymerizable monomer in the liquid A is not particularly limited, and is appropriated adjusted in consideration of the concentration of an initiator in the liquid B, the flow rate of the liquid B introduced, the desired molecular weight of the polymer, and the like. The content of the anionic polymerizable monomer in the liquid A can be 1% to 100% by mass for example, and is preferably 3% to 70% by mass, more preferably 5% to 50% by mass, and still more preferably 10% to 40% by mass.

From the viewpoint of viscosity and the removal of heat generated by a reaction, the molar concentration of the anionic polymerizable monomer in the liquid A is preferably 0.5 to 10 M (mol/L), and more preferably 0.5 to 5 M.

<Anionic Polymerization Initiator Supply Flow Path (2)>

The anionic polymerization initiator supply flow path (2) is a flow path for supplying the liquid B introduced from the inlet port (II) to the Joining portion (J1). The equivalent diameter of the anionic polymerization initiator supply flow path (2) is preferably 1 to 10 mm. In a case where the equivalent diameter of the anionic polymerization initiator supply flow path (2) is equal to or greater than 1 mm, even though the flow rate is increased to some extent, it is possible to inhibit the internal pressure of the system from excessively increasing and to further increase the polymer productivity. In a case where the equivalent diameter of the anionic polymerization initiator supply flow path (2) is equal to or smaller than 10 mm, the temperature of the liquid can be appropriately controlled at a point in time when the liquid is introduced into the joining portion (J1). The equivalent diameter of the anionic polymerization initiator supply flow path (2) is more preferably 1 to 8 mm, and even more preferably 1 to 6 mm.

The length of the anionic polymerization initiator supply flow path (2) is not particularly limited, and the anionic polymerization initiator supply flow path (2) can be constituted, for example, with a tube having a length of about 10 cm to 15 m (preferably 30 cm to 10 m).

The material of the tube is not particularly limited. As the tube, it is possible to use a tube formed of a material exemplified above for the anionic polymerizable monomer supply flow path (1).

The flow rate at which the liquid B is introduced from the inlet port (II) is preferably higher than 10 mL/min and equal to or lower than 2,000 mL/min. In a case where the flow rate of the liquid B is within the above range, the mixing efficiency in the joining portion is increased. Therefore, a more monodisperse polymer can be obtained, and the concern about the pressure loss is reduced. The flow rate of the liquid B introduced is preferably 11 to 2,000 mL/min. Furthermore, the flow rate of the liquid B introduced may be 12 to 1,000 mL/min or 12 to 600 mL/min, and can be 12 to 300 mL/min.

From the viewpoint of controlling the molecular weight of the polymer, a flow rate B at which the liquid B is introduced from the inlet port (II) is preferably lower than a flow rate A at which the liquid A is introduced from the inlet port (I). The ratio between the flow rate A and the flow rate B represented by [flow rate A]/[flow rate B] is preferably 20/1 to 1.2/1, and more preferably 10/1 to 1.3/1. In the present specification, the unit of a flow rate is mL/min.

—Liquid B Containing Anionic Polymerization Initiator and Non-Polar Solvent—

The liquid B flowing in the anionic polymerization initiator supply flow path (2) is usually a solution obtained by dissolving an anionic polymerization initiator in a solvent containing a non-polar solvent. Examples of the non-polar solvent contained in the liquid B include hexane, heptane, octane, cyclohexane, methyl cyclohexane benzene, toluene, xylene, decalin, tetralin, derivatives of these, and the like.

The non-polar solvent contained in the liquid B preferably contains at least one aromatic hydrocarbon or at least one saturated hydrocarbon. In this case, the total ratio of the aromatic hydrocarbon and the saturated hydrocarbon to the non-polar solvent is preferably equal to or higher than 50% by mass, more preferably equal to or higher than 70% by mass, even more preferably equal to or higher than 80% by mass, and still more preferably equal to or higher than 90% by mass. The non-polar solvent is particularly preferably at least one aromatic hydrocarbon or at least one saturated hydrocarbon. The aromatic hydrocarbon is preferably at least one of toluene or xylene, and more preferably toluene. The saturated hydrocarbon is preferably at least one of hexane, heptane, or cyclohexane, and more preferably hexane. The non-polar solvent contained in the liquid B is more preferably at least one of toluene or hexane.

The liquid B may further contain a polar solvent as long as the liquid B contains a non-polar solvent. In a case where the liquid B contains a polar solvent, the polar solvent may be appropriately selected according to the type of the anionic polymerization initiator to be used. Examples of the polar solvent include an ether solvent (a linear, branched, or cyclic ether solvent) and the like. Specifically, examples of the ether solvent include tetrahydrofuran, dioxane, trioxane, methyl t-butyl ether, cyclopentyl methyl ether, ethylene glycol dibutyl ether, diethylene glycol dimethyl ether, diethylene glycol diethyl ether, diethylene glycol dibutyl ether, derivatives of these, and the like.

The ratio of the non-polar solvent to all the solvents contained in the liquid B is preferably equal to or higher than 40% by mass, more preferably equal to or higher than 50% by mass, even more preferably equal to or higher than 60% by mass, and particularly preferably equal to or higher than 70% by mass. The ratio may be equal to or higher than 80% by mass or equal to or higher than 90% by mass. It is also preferable that all the solvents contained in the liquid B be non-polar solvents.

—Anionic Polymerization Initiator—

The anionic polymerization initiator used in the liquid B is not particularly limited, and a wide variety of initiators used in general anionic polymerization can be used. The anionic polymerization initiator is appropriately selected according to the type of the monomer to be used.

In a case where the method of the polymerization described above is anionic polymerization which is a living polymerization method, examples of the polymerization initiator include an organic lithium compound and an organic magnesium compound.

The organic lithium compound is not particularly limited, and can be appropriately selected from conventionally known organic lithium compounds. Examples thereof include alkyl lithium such as methyl lithium, ethyl lithium, propyl lithium, butyl lithium (n-butyllithium, sec-butyllithium, iso-butyllithium, tert-butyllithium, or the like), pentyl lithium, hexyl lithium, methoxymethyl lithium, or ethoxymethyl lithium; benzyl lithium such as α-methylstyryllithium, 1,1-diphenyl-3-methylpentryllithium, or 3-methyl-1,1-diphenylpentyllithium; alkenyl lithium such as vinyl lithium, allyl lithium, propenyl lithium, or butenyl lithium, alkynyl lithium such as ethynyl lithium, butynyl lithium, pentynyl lithium, or hexynyl lithium; aralkyl lithium such as benzyl lithium or phenyl ethyl lithium; aryl lithium such as phenyl lithium or naphthyl lithium; heterocyclic lithium such as 2-thienyllithium, 4-pyridyllithium, or 2-quinolyllithium; an alkyl lithium-magnesium complex such as tri(n-butyl)magnesium lithium or trimethyl magnesium lithium, and the like. Among these, alkyl lithium is more preferable, and n-butyllithium is particularly preferable, because these compounds have high reactivity and can cause an initiation reaction at a high speed. Among butyl lithium compounds, n-butyllithium is preferable because, for example, this compound exhibits high stability in a solution state. For example, in a case where sec-butyllithium is used, this compound is gradually precipitated in a suspension state without being dissolved, which leads to a concern that the quality stability in the industrial production of a polymer may become problematic. Furthermore, tert-butyllithium is not suitable for industrial production because this compound is extremely flammable and ignitable. One of the above organic lithium compounds may be used singly, or two or more compounds among the above organic lithium compounds may be used in combination.

Examples of the organic magnesium compound include di-n-butylmagnesium, di-tert-butylmagnesium, di-sec-butylmagnesium, n-butyl-sec-butylmagnesium, n-butyl-ethylmagnesium, di-n-amylmagnesium, dibenzyl magnesium, diphenyl magnesium, and the like.

The content of the anionic polymerization initiator in the liquid B is not particularly limited, and is appropriated adjusted in consideration of the concentration of the monomer in the liquid A, the flow rate of the liquid A introduced, the desired molecular weight of the polymer, and the like. The content of the anionic polymerization initiator in the liquid B is generally 0.01% to 20% by mass, more preferably 0.01% to 15% by mass, even more preferably 0.01% to 10% by mass, and still more preferably 0.05% to 10% by mass.

From the viewpoint of controlling the molecular weight of a polymer, the molar concentration of the anionic polymerization initiator in the liquid B is preferably 0.004 to 1.6 M, more preferably 0.008 to 1.6 M, and even more preferably 0.008 to 0.8 M.

Regarding the amount of the liquid A and the liquid B introduced, in a case where the liquid A and the liquid B are assumed to be homogeneously mixed together in the joining portion (J1), a ratio of equivalent of anionic polymerization initiator:equivalent of anionic polymerizable monomer in the mixed solution is preferably 1:5 to 1:5,000, more preferably 1:10 to 1:5,000, and particularly preferably 1:10 to 1:1,000. The equivalent ratio that is within the particularly preferred range described above is advantageous, because in this range, it is possible to obtain a polymer having a molecular weight that is substantially equal to a theoretical molecular weight. That is, in a case where the monomer is a compound having one polymerizable functional group, the amount of the monomer used with respect to 1 mol of the initiator is preferably 5 to 5,000 mol, more preferably 10 to 5,000 mol, and particularly preferably 10 to 1,000 mol.

<Joining Portion (J1)>

The liquid A flowing in the anionic polymerizable monomer supply flow path (1) and the liquid B flowing in the anionic polymerization initiator supply flow path (2) join together at the joining portion (J1). The joining portion (J1) is not particularly limited as long as this portion functions as a mixer, can allow the anionic polymerizable monomer supply flow path (1) and the anionic polymerization initiator supply flow path (2) to join together to form a single flow path, and can send the conjoined liquid $M^{AB}$ to the pre-reaction tube (5) connected to the end portion of the downstream side of the joining portion (J1). In the embodiment shown in FIG. 1, a T-shaped connector is used as the joining portion (J1).

The equivalent diameter of the flow path in the joining portion (J1) is preferably 0.2 to 10 mm from the viewpoint of further improving the mixing performance, and more preferably 1 to 5 mm from the viewpoint of further inhibiting pressure loss.

The material of the joining portion (J1) is not particularly limited. For example, it is possible to use the joining portion (J1) consisting of materials such as perfluoroalkoxyalkane (PFA), Teflon (registered trademark), an aromatic polyether ketone-based resin, stainless steel, copper or a copper alloy, nickel or a nickel alloy, titanium or a titanium alloy, quartz glass, and soda lime glass.

As the joining portion (J1), a commercially available mixer can be used. Examples thereof include MICROGLASS REACTOR manufactured by Micro Glass Co., Ltd.; CYTOS manufactured by CPC Systems, Ltd.; YM-1 and YM-2 mixers manufactured by Yamatake Co., Ltd.; MIXING TEE &TEE manufactured by Shimadzu GLC Ltd. (T-shaped connector); MIXING TEE & TEE manufactured by GL Sciences Inc. (T-shaped connector); MIXING TEE & TEE manufactured by Upchurch Scientific (T-shaped connector); MIXING TEE & TEE manufactured by Valco Instruments Co., Inc. (T-shaped connector); a T-shaped cross connector manufactured by Swagelok Company, and the like. All of these can be used in the present invention.

<Pre-Reaction Tube (5)>

After the liquid A and the liquid B join together at the joining portion (J1) and mixed together, the resulting conjoined liquid $M^{AB}$ flows to the downstream in the pre-reaction tube (5).

The form of the pre-reaction tube (5) is not particularly limited. Generally, a tube is used as the pre-reaction tube (5). The material preferred for the pre-reaction tube (5) is the same as the material preferred for the anionic polymerizable monomer supply flow path (1) described above. It is preferable that the conjoined liquid $M^{AB}$ flowing in the pre-reaction tube (5) stay in the tube for a short period of time.

In other words, it is preferable that an initiation reaction or a growth reaction (polymerization reaction) substantially do not occur while the liquid $M^{AB}$ is flowing in the pre-reaction tube Immediately after the liquid $M^{AB}$ passes through the pre-reaction tube, a monomer conversion rate (at a point where the liquid $M^{AB}$ joins with the liquid C) is preferably equal to or lower than 5%, more preferably equal to or lower than 4%, even more preferably equal to or lower than 3%, and still more preferably equal to or lower than 2%. The lower the monomer conversion rate in the pre-reaction tube, the more preferable. The monomer conversion rate is generally equal to or higher than 0.1%, and practically equal to or higher than 0.2%.

Generally, the equivalent diameter of the pre-reaction tube (5) is 0.1 to 50 mm, more preferably 0.2 to 20 mm, even more preferably 0.4 to 15 mm, still more preferably 0.7 to 10 mm, and yet more preferably 1 to 5 mm. The length of the pre-reaction tube (5) is usually 0.2 to 5 m, preferably 0.4 to 3 m, and more preferably 0.6 to 2 m.

<Polar Solvent Supply Flow Path (3)>

The polar solvent supply flow path (3) is a flow path for supplying the liquid C introduced from the inlet port (III) to the joining portion (J2). The equivalent diameter of the polar solvent supply flow path (3) is more preferably 1 to 10 mm, even more preferably 1 to 8 mm, and still more preferably 1 to 6 mm. The length of the polar solvent supply flow path (3) is not particularly limited. For example, polar solvent supply flow path (3) can be constituted with a tube having a length of about 10 cm to 15 m (preferably 30 cm to 10 m). The material preferred for the polar solvent supply flow path (3) is the same as the material preferred for the anionic polymerizable monomer supply flow path (1) described above.

—Liquid C Containing Polar Solvent—

The liquid C flowing in the polar solvent supply flow path (3) contains a polar solvent. Examples of the polar solvent contained in the liquid C include an ether solvent (a linear, branched, or cyclic ether solvent) and the like. Specifically, for example, it is possible to use ether solvents such as tetrahydrofuran, dioxane, trioxane, methyl t-butyl ether, cyclopentyl methyl ether, ethylene glycol dibutyl ether, diethylene glycol dimethyl ether, diethylene glycol diethyl ether, diethylene glycol dibutyl ether, and derivatives of these. From the viewpoint of reaction controllability, costs, and the like, a cyclic ether solvent is preferable, and tetrahydrofuran is more preferable.

In addition to the ether solvent, for example, it is possible to use polar solvents such as N,N-dimethylacetamide, N-methylpyrrolidone, 1,3-dimethyl-2-imidazolidinone, N,N'-dimethylpropylene urea, tert-butyl acetate, N,N-diisopropylethylamine, N,N,N',N'-tetramethylethylenediamine, and tetramethylpropylenediamine.

The content of solvents in the liquid C is preferably equal to or higher than 90% by mass, and more preferably equal to or higher than 95% by mass.

The ratio of the polar solvent to the solvents constituting the liquid C is preferably equal to or higher than 40% by mass, more preferably equal to or higher than 50% by mass, even more preferably equal to or higher than 60% by mass, and particularly preferably equal to or higher than 70% by mass. The ratio may be equal to or higher than 80% by mass or equal to or higher than 90% by mass. It is also preferable that all the solvents contained in the liquid C be polar solvents.

In a case where the liquid C contains a component other than the polar solvent, the rest of the liquid C except for the polar solvent is preferably a non-polar solvent. Examples of the non-polar solvent include hexane, heptane, octane, cyclohexane, methyl cyclohexane benzene, toluene, xylene, decalin, tetralin, derivatives of these, and the like. It is preferable that the non-polar solvent that can be contained in the liquid C contain an aromatic hydrocarbon. In this case, the ratio of the aromatic hydrocarbon to the non-polar solvent is preferably equal to or higher than 50% by mass, more preferably equal to or higher than 70% by mass, even more preferably equal to or higher than 80% by mass, and still more preferably equal to or higher than 90% by mass. The non-polar solvent is particularly preferably an aromatic hydrocarbon. The aromatic hydrocarbon is preferably at least one of toluene or xylene, and more preferably toluene.

The concentration of the polar solvent in the liquid C is preferably higher than both the concentration of the polar solvent in the liquid A and the concentration of the polar solvent in the liquid B. In the present invention, the polarity of the solvent of the conjoined liquid $M^{ABC}$ of the conjoined liquid $M^{AB}$ and the liquid C is made higher than the polarity of the solvent of the conjoined liquid $M^{AB}$ (that is, the polarity of the solvent of the polymerization reaction solution flowing in the reaction tube is made higher than the polarity of the solvent of the conjoined liquid of the liquid A and the liquid B flowing in the pre-reaction tube). Here, "the polarity of the solvent of the conjoined liquid $M^{ABC}$ is made higher than the polarity of the solvent of the conjoined liquid $M^{AB}$" means that the concentration of the polar solvent in the conjoined liquid $M^{ABC}$ is made higher than the concentration of the polar solvent in the conjoined liquid $M^{AB}$. These concentrations are based on mass.

The ratio (% by mass) of a polar solvent to the solvent in the conjoined liquid $M^{ABC}$ is preferably 1.5 times or more and more preferably 2 times or more of the ratio (% by mass) of a polar solvent to the solvent in conjoined liquid $M^{AB}$.

<Joining Portion (J2)>

The conjoined liquid $M^{AB}$ flowing in the pre-reaction tube (5) and the liquid C flowing in the polar solvent supply flow path (3) join together at the joining portion (J2). The joining portion (J2) is not particularly limited as long as this portion functions as a mixer, allows the pre-reaction tube (5) and the polar solvent supply flow path (3) to join together to form a single flow path, and can send the solution formed by the joining to the reaction tube (6) of downstream. In the embodiment shown in FIG. 1, a T-shaped connector is used as the joining portion (J2).

The equivalent diameter of the flow path in the joining portion (J2) is preferably 0.2 to 10 mm from the viewpoint of further improving the mixing performance, and more preferably 1 to 10 mm from the viewpoint of further inhibiting pressure loss.

The material of the joining portion (J2) is not particularly limited, and it is possible to use a substance consisting of the same materials as those described above regarding the joining portion (J1). Furthermore, specific examples of mixers that can be adopted as the joining portion (J2) are the same as the specific examples of mixers that can be adopted as the joining portion (J1).

In the joining portion (J2), the polarity of the solvent in the conjoined liquid $M^{ABC}$ formed by the joining with the liquid C is increased instantaneously. Presumably, the increase in polarity may trigger the initiation reaction to proceed all at once. That is, presumably, the initiation reaction could be started all at once in the joining portion (J2) substantially without causing the polymerization reaction in the pre-reaction tube (5), and through the growth reaction in the reaction tube (6) following the initiation reaction, the monodispersity of the obtained polymer could be greatly increased.

<Reaction Tube (6)>

After the conjoined liquid $M^{AB}$ and the liquid C join together at the joining portion (J2), the formed conjoined liquid $M^{ABC}$ flows into the reaction tube (6) which is a reaction flow path. While the liquid $M^{ABC}$ is flowing to the downstream in the reaction tube (6), the anionic polymerizable monomer undergoes anionic polymerization (the growth reaction proceeds).

The form of the reaction tube (6) is not particularly limited. Generally, a tube is used as the reaction tube (6). The material preferred for the reaction tube (6) is the same as the material preferred for the anionic polymerizable monomer supply flow path (1) described above. The reaction time required for the anionic polymerization can be adjusted according to the equivalent diameter and the length of the reaction tube (6), the setting of the flow rate of a liquid feeding pump, and the like. The retention time of a reaction solution flowing in the reaction tube (6) may be appropriately adjusted according to the molecular weight of the desired polymer. Generally, the equivalent diameter of the reaction tube (6) is 0.1 to 50 mm, more preferably 0.2 to 20 mm, even more preferably 0.4 to 15 mm, still more preferably 0.7 to 10 mm, and yet more preferably 1 to 5 mm. The length of the reaction tube (6) is preferably 3 to 50 m, and more preferably 5 to 50 m.

<Polymerization Terminator Supply Flow Path (4)>

The polymerization terminator supply flow path (4) is a flow path for supplying a polymerization terminator introduced from the inlet port (IV) to the joining portion (J3). The equivalent diameter of the polymerization terminator supply flow path (4) is more preferably 1 to 10 mm, even more preferably 1 to 8 mm, and still more preferably 1 to 6 mm. The length of the polymerization terminator supply flow path (4) is not particularly limited. For example, the polymerization terminator supply flow path (4) can be constituted with a tube having a length of about 10 cm to 15 m (preferably 30 cm to 10 m). The material preferred for the polymerization terminator supply flow path (4) is the same as the material preferred for the anionic polymerizable monomer supply flow path (1) described above.

—Polymerization Terminator—

The polymerization terminator is not particularly limited as long as it is a liquid containing a component (polymerization termination component) deactivating anions which are active species. Examples of the polymerization terminator include an aqueous solution or an organic solution containing at least either an alcohol or an acidic substance as a polymerization termination component (for example, a solution containing tetrahydrofuran (THF), methyl t-butyl ether, dioxane, cyclopentyl methyl ether, toluene, or the like as a solvent). Furthermore, as a polymerization terminator, it is also possible to use a liquid containing an electrophile such as a halogenated alkyl or chlorosilane as a polymerization termination component.

Examples of the alcohol as a polymerization termination component include methanol, ethanol, propanol, isopropyl alcohol, and the like.

Examples of the acidic substance as a polymerization termination component include acetic acid, hydrochloric acid, and the like.

Examples of halogenated alkyl as a polymerization termination component include alkyl fluoride, alkyl iodide, and the like.

In the mixed solution joined with the polymer solution, the amount of the polymerization termination components such as an alcohol, an acidic substance, and an electrophile contained in the polymerization terminator is preferably 1 to 100 mol with respect to 1 mol of the polymerization initiator.

The flow rate at which the polymerization terminator is introduced from the inlet port (IV) is not particularly limited, and can be appropriately selected according to the purpose. For example, the flow rate can be set to 1 to 3,000 mL/min. The flow rate is more preferably 2 to 2,000 mL/min, and even more preferably 4 to 2,000 mL/min. In a case where the flow rate is within the above range, solutions can be rapidly mixed together, and the concerns about the pressure loss is reduced. The flow rate at which the polymerization terminator is introduced may be 5 to 2,000 mL/min or 10 to 1,000 mL/min. The flow rate can be 20 to 800 mL/min or 40 to 600 mL/min.

<Joining Portion (J3)>

The polymerization reaction solution that has undergone anionic polymerization reaction while flowing in the reaction tube (6) and the polymerization terminator that flows in the polymerization terminator supply flow path (4) join together at the joining portion (J3). The joining portion (J3) is not particularly limited as long as this portion functions as a mixer, allows the reaction tube (6) and the polymerization terminator supply flow path (4) to join together to form a single flow path, and can send the solution formed by the joining to the pipe line (7) of downstream. In the embodiment shown in FIG. 1, a T-shaped connector is used as the joining portion (J3).

The equivalent diameter of the flow path in the joining portion (J3) is preferably 0.2 to 10 mm from the viewpoint of further improving the mixing performance, and more preferably 1 to 10 mm from the viewpoint of further inhibiting pressure loss.

The material of the joining portion (J3) is not particularly limited, and it is possible to use a substance consisting of the same materials as those described above regarding the joining portion (J1). Furthermore, specific examples of mixers that can be adopted as the joining portion (J3) are the same as the specific examples of mixers that can be adopted as the joining portion (J1).

<Pipe Line (7)>

While flowing in the pipe line (7), the mixed solution containing the polymerization reaction solution and the polymerization terminator have a reaction, and the anions are deactivated, which terminates polymerization.

The pipe line (7) can be constituted with a tube. From the viewpoint of more precisely controlling the liquid temperature of the liquid flowing in the pipe line (7), the equivalent diameter of the pipe line (7) is preferably 1 to 50 mm, and more preferably 1 to 10 mm. The length of the pipe line (7) may be appropriately adjusted according to the equivalent diameter, the flow rate, and the molecular weight of the desired polymer. The length of the pipe line (7) is preferably 1 to 20 m, and more preferably 2 to 10 m. The material preferred for the pipe line (7) is the same as the material preferred for the anionic polymerizable monomer supply flow path (1) described above.

The liquid temperature of the liquid flowing in the pipe line (7) is not particularly limited. However, as shown in FIG. 1, it is preferable that at least the temperature of the upstream side of the liquid be the same as the temperature of the liquid flowing in the reaction tube (6).

The flow rate of the liquid flowing in the pipe line (7) equals the sum of the flow rate of the liquid flowing in the polymerization terminator supply flow path (4) and the flow rate of the liquid flowing in the reaction tube (6).

In a case where a liquid is collected at the downstream of the pipe line (7), the desired polymer can be obtained.

Figure 2:
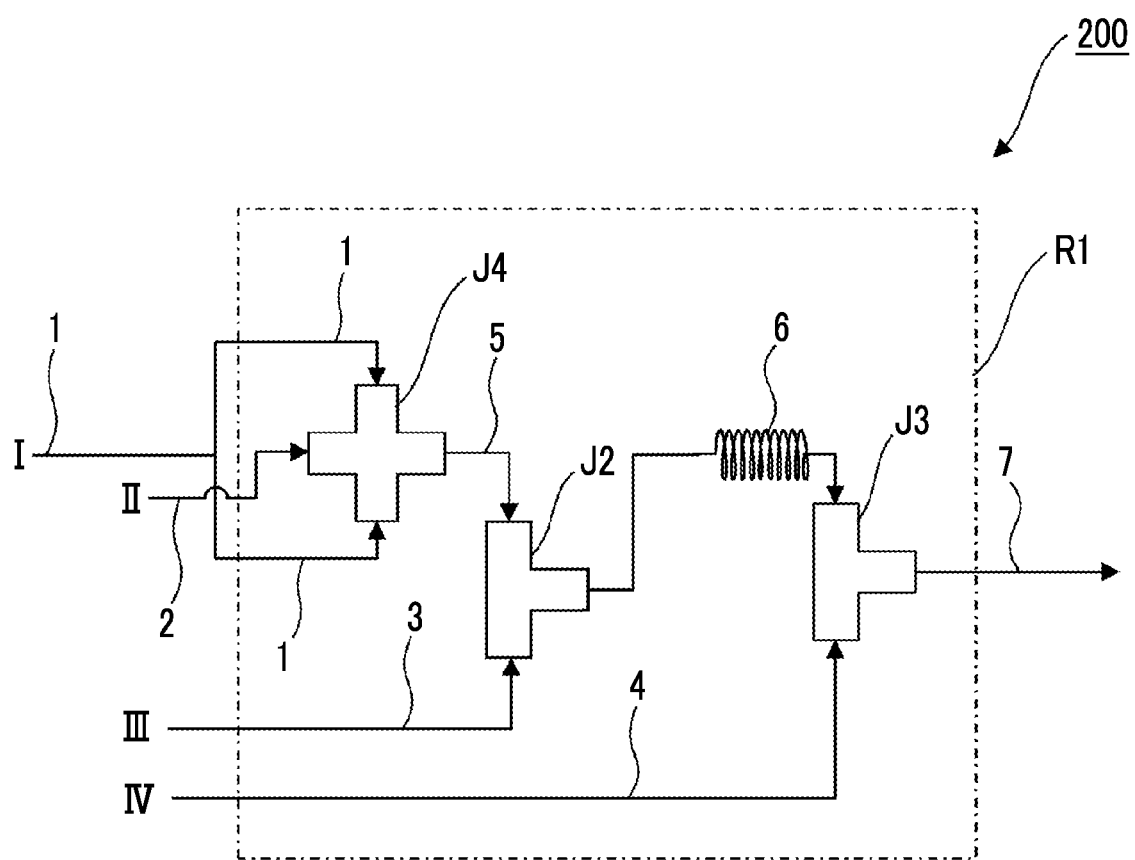
FIG. 2 is a view for schematically illustrating another embodiment of a flow-type reaction system of the present invention.

Another embodiment of the flow-type reaction system for performing the manufacturing method according to an embodiment of the present invention will be described using FIG. 2. The embodiment shown in FIG. 2 is the same as the embodiment shown in FIG. 1, except that the anionic polymerizable monomer supply flow path (1) branches off into two flow paths in the middle of the flow path (1). In the embodiment shown in FIG. 2, the anionic polymerizable monomer supply flow path (1) branches off into two flow paths in the middle of the flow path (1). The two flow paths branched off from the flow path (1) are introduced into the joining portion (J4), which is a cross connector, through connection ports facing each other and join together. In this embodiment, the anionic polymerization initiator supply flow path (2), through which the liquid B flows, is connected to a connection port of the joining portion (J4) that faces a site of the joining portion (J4) connected to the pre-reaction tube (5). In a case where the anionic polymerizable monomer supply flow path (1) branches off as described above, the monomer and the initiator are more rapidly and more homogeneously mixed together in the joining portion (J4). Accordingly, the molecular weight distribution of the obtained polymer can be further narrowed, and a more highly monodisperse polymer can be obtained. The inner diameter of the cross connector is preferably 1 to 10 mm.

A wide variety of commercially available products can be widely used as the cross connector. For example, as the commercially available products, it is possible to use a cross connector manufactured by Upchurch Scientific; UNION CROSS manufactured by Swagelok Company; a 4-way joint manufactured by EYELA, and the like.

In the embodiment shown in FIG. 2, the anionic polymerizable monomer supply flow path (1) branches off into two flow paths. However, the flow path (1) may branches off into three or more flow paths, and this embodiment is also preferable as an embodiment of the present invention. In addition, an embodiment may also be adopted in which the anionic polymerization initiator supply flow path (2) branches off with or without branching off the anionic polymerizable monomer supply flow path (1) and the flow paths (1) and (2) join together in a joining portion. This embodiment is also included in the embodiments of the present invention. Particularly, it is preferable to adopt an embodiment in which the anionic polymerizable monomer supply flow path (1) branches off into two or more flow paths and the anionic polymerization initiator supply flow path (2) does not branch off or branches off into two or more flow paths. The relationship between the number of branches of the anionic polymerizable monomer supply flow path (1) and the number of branches of the anionic polymerization initiator supply flow path (2) is more preferably set as in the following embodiment i) or ii).

i) Embodiment in which the anionic polymerizable monomer supply flow path (1) has two branches while the anionic polymerization initiator supply flow path (2) has no branch.

ii) Embodiment in which the anionic polymerizable monomer supply flow path (1) has three or more branches, the anionic polymerization initiator supply flow path (2) has two or more branches, and the number of branches of the anionic polymerizable monomer supply flow path (1) is larger than the number of branches of the anionic polymerization initiator supply flow path (2).

The total number of flow paths, which are connected to the joining portion of the liquid A and the liquid B and through which the liquid A flows, and flow paths, which are connected to the joining portion of the liquid A and the liquid B and through which the liquid B flows, is preferably 3 to 10, more preferably 3 to 8, even more preferably 3 to 6, and still more preferably 3 to 5. In this case, it is preferable that the number of branches of the anionic polymerizable monomer supply flow path (1) be larger than the number of branches of anionic polymerization initiator supply flow path (2).

The joining portion, to which the above number of flow paths can be connected, can be constituted with a connector having as many connection ports as the number of flow paths to be connected thereto. For example, in a case where a 6-way connector is used, the total number of flow paths through which the liquid A flows and flow paths through which the liquid B flows can be set to 5, the remaining one connection port can be used as an outlet, and the pre-reaction tube can be connected to the outlet.

As the connector having 5 or more connection ports that is usable in the present invention, a wide variety of commercially available products can be used. Examples of the commercially available products include a 6-way joint manufactured by EYELA, a 6-port joint manufactured by Sugiyama Shoji, a 6-port manifold manufactured by Upchurch Scientific, and the like.

The connector having 5 or more connection ports preferably has an inner diameter of 1 to 10 mm.

Hitherto, an embodiment has been described in which the flow path having branches has one inlet port and branches off in the middle of the flow path. However, an embodiment may also be adopted in which a plurality of inlet ports are provided for one solution, and this embodiment is also included in the embodiments of the present invention. For example, it is possible to adopt an embodiment in which a plurality of anionic polymerizable monomer supply flow paths (1) are prepared and the plurality of anionic polymerizable monomer supply flow paths (1) are caused to join together in a joining portion. This embodiment is also applied to the anionic polymerization initiator supply flow path (2).

In the embodiments shown in FIGS. 1 and 2, the retention time (polymerization reaction time) of the polymerization reaction solution in the reaction tube 6 is preferably equal to or longer than 15 seconds, more preferably 20 to 1,800 seconds, and even more preferably 20 to 600 seconds.

According to the method for manufacturing a polymer of an embodiment of the present invention, it is possible to obtain a polymer having a highly monodisperse molecular weight distribution at an excellent monomer conversion rate.

The present invention has been described together with preferred embodiments thereof. However, the present invention is not limited to the above embodiments except for the matters specified by the present invention. Hereinafter, the present invention will be more specifically described based on examples, but the present invention is not limited to the examples.

EXAMPLES

Example 1

By using the flow-type reaction system 200 constituted as shown in FIG. 2, a polymer was synthesized by an anionic polymerization reaction. Details of each portion are as below.

Liquid Feeding Pump (not Shown in Drawing):

PU716B or PU718 manufactured by GL Sciences Inc. was installed on all of the inlet ports I, II, III and IV so that the system was fed with liquids. On the side of a flow rate outlet, a pulse damper HPD-1, a backpressure valve (44-2361-24) manufactured by TESCOM, and a relief valve RHA (4 MPa) manufactured by IBS COMPANY were installed in this order.

Low-Temperature Constant-Temperature Tank (R1):

A low temperature constant-temperature water tank PSL-2000 with a magnetic stirrer manufactured by EYELA was used, and the temperature thereof was set to −25° C.

Anionic Polymerizable Monomer Supply Flow Path (1):

The flow path (1) had a structure established by dividing a single SUS tube into two parts by using a T-shaped connector.

More specifically, a T-connector (U-429, inner diameter: 1.0 mm) manufactured by Upchurch Scientific was connected to an SUS316 tube having an outer diameter of 1/16 inch, an inner diameter of 1.0 mm, and a length of 10 m. Furthermore, two SUS 316 tubes each having an outer diameter of 1/16 inch, an inner diameter of 1.0 mm, and a length of 5 cm were connected to the T-connector such that the tubes faced each other, thereby preparing the anionic polymerizable monomer supply flow path (1).

Anionic Polymerization Initiator Supply Flow Path (2):

An SUS316 tube was used which has an outer diameter of 1/16 inches, an inner diameter of 1.0 mm, and a length of 10 m.

Joining Portion (J4) (Cross Connector):

A cross connector (U-431, inner diameter: 1.0 mm) manufactured by Upchurch Scientific was used.

The two SUS316 tubes, which were connected to the T-shaped connector constituting the anionic polymerizable monomer supply flow path (1) so as to face each other, were connected to two connection ports facing each other among four connection ports of the aforementioned cross connector. One of the two other connection ports was connected to the anionic polymerization initiator supply flow path (2), and the other connection port was used as an outlet for discharging a liquid (connection port for the pre-reaction tube (5)).

Pre-Reaction Tube (5):

An SUS316 tube was used which has an outer diameter of 1/8 inches, an inner diameter of 2.17 mm, and a length of 1 m.

Polar Solvent Supply Flow Path (3):

An SUS316 tube was used which has an outer diameter of 1/16 inches, an inner diameter of 1.0 mm, and a length of 10 m.

Joining Portion (J2) (T-Shaped Connector):

UNION TEE (SS-200-3, inner diameter: 2.3 mm) manufactured by Swagelok Company was used.

The pre-reaction tube (5) and the polar solvent supply flow path (3) were connected to two connection ports facing each other among three connection ports of the UNION TEE. The remaining connection port was used as an outlet for discharging a liquid (connection port for the reaction tube (6)).

Reaction Tube (6):

From the upstream side to the downstream side, (i) SUS316 tube having an outer diameter of 1/8 inch, an inner diameter of 2.17 mm, and a length of 15 m and (ii) SUS316 tube having an outer diameter of 8 mm, an inner diameter of 6 mm, and a length of 20 m were connected in this order by using UNION.

Polymerization Terminator Supply Flow Path (4):

An SUS316 tube was used which has an outer diameter of 1/8 inches, an inner diameter of 2.17 mm, and a length of 10 m.

Joining Portion (J3) (T-Shaped Connector):

UNION TEE (SS-200-3, inner diameter: 2.3 mm) manufactured by Swagelok Company was used.

The reaction tube (6) and the polymerization terminator supply flow path (4) were connected to two connection ports facing each other among three connection ports of the UNION TEE. The remaining connection port was used as an outlet for discharging a liquid (connection port for the pipe line (7)).

Pipe Line (7):

From the upstream side to the downstream side, (i) SUS316 tube having an outer diameter of 1/8 inch, an inner diameter 2.17 mm, and a length 2.5 m and (ii) Teflon tube having an outer diameter of 1/8 inch, an inner diameter of 2.17 mm, and a length of 0.5 m were connected in this order by using UNION.

Monomer-Containing Liquid A to be Introduced into Anionic Polymerizable Monomer Supply Flow Path (1):

<P-Methoxystyrene/Toluene>

Toluene (deoxidation grade) manufactured by FUJIFILM Wako Pure Chemical Corporation and p-methoxystyrene (special grade) manufactured by FUJIFILM Wako Pure Chemical Corporation were added to a 5 L SUS tank, thereby preparing 4 L of a 3.5 M-p-methoxystyrene/toluene solution. This solution was dehydrated using a molecular sieve 3A, thereby obtaining a liquid A.

In the present example, the description of "xM-y/z" means a solution obtained by dissolving y in a solvent z, in which the concentration of y in the solution is xM.

Initiator-containing liquid B to be introduced into anionic polymerization initiator supply flow path (2):

<n-Butyllithium (nBuLi)/Toluene>

Toluene (deoxidation grade) manufactured by FUJIFILM Wako Pure Chemical Corporation was added to a 5 L SUS tank and cooled to 0° C. nBuLi (1.6M-nBuLi/hexane solution) manufactured by KANTO KAGAKU was added thereto, and titrated using menthol/bipyridine, thereby preparing 4 L of a 0.008 M-nBuLi/toluene solution. The solution was adopted as a liquid B.

Polar Solvent-Containing Liquid C to be Introduced into Polar Solvent Supply Flow Path (3):

Tetrahydrofuran (THF) (deoxidation grade) manufactured by FUJIFILM Wako Pure Chemical Corporation was dehydrated using a molecular sieve 3A, thereby obtaining a liquid C.

Polymerization Terminator to be Introduced into Polymerization Terminator Supply Flow Path (4):

<Methanol (MeOH)/THF>

THF (deoxidation grade) manufactured by FUJIFILM Wako Pure Chemical Corporation and MeOH (deoxidation grade) manufactured by FUJIFILM Wako Pure Chemical Industries, Ltd., were added to a 3 L SUS tank, thereby preparing 4 L of a 0.5 M-MeOH/THF solution. The obtained solution was used as a polymerization terminator.

Liquid Feeding Condition:
Liquid A (3.5 M-p-methoxystyrene/toluene): 100 mL/min
Liquid B (0.08 M-nBuLi/toluene): 36.5 mL/min
Liquid C (THF): 114 mL/min
Polymerization terminator (0.5 M-MeOH/THF): 43.8 mL/min Monomer Conversion Rate at Joining Portion (J2):

Instead of the polar solvent supply flow path (3) connected to the joining portion (J2), the polymerization terminator supply flow path (4) was connected to the joining portion (J2), and a polymerization terminator was supplied to the joining portion (J2). From the outlet (exit) of the joining portion (J2), 10 mL of a solution was collected, and the solution was analyzed by gel permeation chromatography (GPC). The monomer conversion rate was determined by calculating the ratio of the peak surface area of the polymer to the total peak surface area of the monomer and the polymer. The monomer conversion rate at the joining portion (J2) (that is, the monomer conversion rate in the liquid $M^{AB}$ just passing through the pre-reaction tube (5)) was 1 mol %.

Extraction:

From the outlet of the pipe line (7), 10 mL of a solution containing a polymer was collected, and the molecular weight and the molecular weight distribution of the polymer were measured by gel permeation chromatography (GPC). As a result, the number-average molecular weight (Mn) was 14,000, and the molecular weight distribution (dispersity, Mw/Mn) was 1.04. No monomer was detected from the collected sample, and the monomer conversion rate was 100 mol %.

In the present specification, GPC was performed under the following condition.

Device: HLC-8220GPC (manufactured by Tosoh Corporation)
Detector: differential refractometer (Refractive Index (RI) detector)
Pre-column: TSK GUARD COLUMN HXL-L 6 mm×40 mm (manufactured by Tosoh Corporation)
Sample side column: the following three columns directly connected in the following order (manufactured by Tosoh Corporation)
  TSK-GEL GMHXL 7.8 mm×300 mm
  TSK-GEL G4000HXL 7.8 mm×300 mm
  TSK-GEL G2000HXL 7.8 mm×300 mm
Reference side column: TSK-GEL G1000HXL 7.8 mm×300 mm
Temperature of constant-temperature tank: 40° C.
Mobile layer: THF
Flow rate of mobile layer on sample side: 1.0 mL/min
Flow rate of mobile layer on reference side: 1.0 mL/min
Sample concentration: 0.1% by mass
Amount of sample injected: 100 μL
Data pickup time: 5 minutes to 45 minutes after injection of sample
Sampling pitch: 300 msec Example 2

A polymer was obtained in the same manner as in Example 1, except that in Example 1, the type of liquid and the liquid feeding conditions were changed as follows.
Liquid A (3.5 M-t-butoxystyrene/(toluene/THF=78/22 (mass ratio))): 60 mL/min
Liquid B (0.08 M-nBuLi/toluene): 21.9 mL/min
Liquid C (THF): 49 mL/min
Polymerization terminator (0.5 M-MeOH/THF): 26.3 mL/min The obtained polymer had a number-average molecular weight of 18,300, a molecular weight distribution (dispersity, Mw/Mn) of 1.04, and a monomer conversion rate of 100 mol %.

The monomer conversion rate at the joining portion (J2) was 1 mol %.

Example 3

A polymer was obtained in the same manner as in Example 1, except that in Example 1, THF used as the liquid C was changed to diethylene glycol dimethyl ether, and the length of the SUS316 tube as the pre-reaction tube (5) was changed to 2.5 m. The obtained polymer had a number-average molecular weight of 14,200, a molecular weight distribution (dispersity, Mw/Mn) of 1.05, and a monomer conversion rate of 100 mol %.

In Example 3, the monomer conversion rate at the joining portion (J2) was 5 mol %.

Comparative Example 1

A polymer was obtained in the same manner as in Example 1, except that in Example 1, the polar solvent supply flow path (3) was not fed with the liquid C (the liquid C feeding pump was not operated). The obtained polymer had a number-average molecular weight of 15,000 and a molecular weight distribution (dispersity, Mw/Mn) of 1.12.

Comparative Example 2

A polymer was obtained in the same manner as in Example 2, except that in Example 2, the polar solvent supply flow path (3) was not fed with the liquid C (the liquid C feeding pump was not operated). The obtained polymer had a number-average molecular weight of 19,800 and a molecular weight distribution (dispersity, Mw/Mn) of 1.10.

Comparative Example 3

A polymer was obtained in the same manner as in Example 1, except that in Example 1, THF used as the liquid C was changed to toluene. The obtained polymer had a number-average molecular weight of 15,200 and a molecular weight distribution (dispersity, Mw/Mn) of 1.12.

Comparative Example 4

A polymer was obtained in the same manner as in Example 2, except that in Example 2, 3.5 M-t-butoxystyrene/(toluene/THF=78/22 (mass ratio)) used as the liquid A was replaced with 3.5 M-t-butoxystyrene/THF. The obtained polymer had a number-average molecular weight of 18,500 and a molecular weight distribution (dispersity, Mw/Mn) of 1.09.

In Comparative Example 4, the monomer conversion rate at the joining portion (J2) was 19 mol %.

Hitherto, the present invention has been described together with the embodiments thereof. However, unless otherwise specified, the present invention is not limited to any of the description of the present invention. The inventors of the present invention consider that the present invention should be interpreted widely without departing from the gist and scope of the present invention described in the attached claims.

100, 200: flow-type reaction system
I, II, III, IV: inlet port
1: anionic polymerizable monomer supply flow path
2: anionic polymerization initiator supply flow path
3: polar solvent supply flow path
4: polymerization terminator supply flow path
5: pre-reaction tube
6: reaction tube
7: pipe line
J1, J2, J3, J4: joining portion
R1: low-temperature constant-temperature tank

What is claimed is:

1. A method for manufacturing a polymer in which anionic polymerization reaction is performed by a flow-type reaction, comprising:
    introducing a liquid A containing an anionic polymerizable monomer and a non-polar solvent, a liquid B containing an anionic polymerization initiator and a non-polar solvent, a liquid C containing a polar solvent, and a polymerization terminator into different flow paths;
    allowing the liquids to flow in their respective flow paths;
    allowing the liquid A and the liquid B to join together at a joining portion;
    allowing a conjoined liquid $M^{AB}$ of the liquid A and the liquid B to join with the liquid C at downstream of the joining portion;
    subjecting the anionic polymerizable monomer to anionic polymerization while a conjoined liquid $M^{ABC}$ of the conjoined liquid $M^{AB}$ and the liquid C is flowing to downstream in a reaction flow path; and
    allowing a polymerization reaction solution flowing in the reaction flow path to join with the polymerization terminator so that the anionic polymerization reaction is terminated and a polymer is obtained,
    wherein due to the joining of the conjoined liquid $M^{AB}$ with the liquid C, a polarity of a solvent of the conjoined liquid $M^{ABC}$ is higher than a polarity of a solvent of the conjoined liquid $M^{AB}$.

2. The method for manufacturing a polymer according to claim 1,
    wherein both the flow path in which the liquid A flows and the flow path in which the liquid B flows have an equivalent diameter of 1 to 10 mm.

3. The method for manufacturing a polymer according to claim 1,
    wherein the conjoined liquid $M^{AB}$ and the liquid C join together in a state where a monomer conversion rate in the conjoined liquid $M^{AB}$ is equal to or lower than 5.0 mol %.

4. The method for manufacturing a polymer according to claim 1,
    wherein due to the joining of the conjoined liquid $M^{AB}$ with the liquid C, a mass ratio of a polar solvent to the solvent in the conjoined liquid $M^{ABC}$ is 1.5 times or more of a mass ratio of a polar solvent to the solvent in the conjoined liquid $M^{AB}$.

5. The method for manufacturing a polymer according to claim 1,
    wherein an ether solvent is used as the polar solvent.

6. The method for manufacturing a polymer according to claim 1,
    wherein a length of the reaction flow path in which the liquid $M^{ABC}$ flows is 3 to 50 m.

7. The method for manufacturing a polymer according to claim 1,
    wherein a number of flow paths, which are connected to the joining portion of the liquid A and the liquid B and in which the liquid A flows, and a number of flow paths, which are connected to the joining portion of the liquid A and the liquid B and in which the liquid B flows, is 3 to 10 in total.

8. The method for manufacturing a polymer according to claim 1,
    wherein at least one organic lithium compound or at least one organic magnesium compound is used as the anionic polymerization initiator.

9. The method for manufacturing a polymer according to claim 1,
    wherein alkyl lithium is used as the anionic polymerization initiator.

10. The method for manufacturing a polymer according to claim 1,
    wherein n-butyllithium is used as the anionic polymerization initiator.

11. The manufacturing method according to claim 1,
    wherein the liquid B contains at least one aromatic hydrocarbon or at least one saturated hydrocarbon as a non-polar solvent.

* * * * *